United States Patent

[11] 3,581,836

[72] Inventors Roy R. Segerdahl, Bellmore;
 Sandford I Greene, Massapequa, N.Y.
[21] Appl. No 881,353
[22] Filed Dec. 2, 1969
[45] Patented June 1, 1971
[73] Assignee Fairchild Camera and Instrument
 Corporation
 Mountain View, Calif.

[54] METHOD FOR REDUCING FRICTIONAL ERRORS IN DETERMINING THE WEIGHT OF AN OBJECT SUPPORTED BY A PNEUMATIC OR HYDRAULIC DEVICE
 4 Claims, 7 Drawing Figs.
[52] U.S. Cl..................................................... 177/1,
 177/146, 177/208, 73/141
[51] Int. Cl....................................................... G01g 19/02
[50] Field of Search........................................... 177/1, 146,
 208, 209, 254, 163; 73/141

[56] References Cited
 UNITED STATES PATENTS
3,338,323  8/1967  Swersey....................... 177/209X
3,446,298  5/1969  Cory et al. ................... 177/163X
3,456,749  7/1969  Smieja........................... 177/146

Primary Examiner—Richard B. Wilkinson
Assistant Examiner—George H. Miller, Jr.
Attorney—Roger S. Borovoy ABSTRACT: A device supporting an object has its internal pressure successively increased and decreased to determine the change in pressure experienced between the steady-state pressure required to raise the object and that required to merely support the object. The lower steady-state pressure plus one-half the difference in pressure between the higher and lower steady-state pressures is then representative of the actual weight supported by the device.

PATENTED JUN 1 1971 3,581,836

INVENTOR
ROY R. SEGERDAHL
SANDFORD F. GREENE

BY Roger S. Borovoy
ATTORNEY

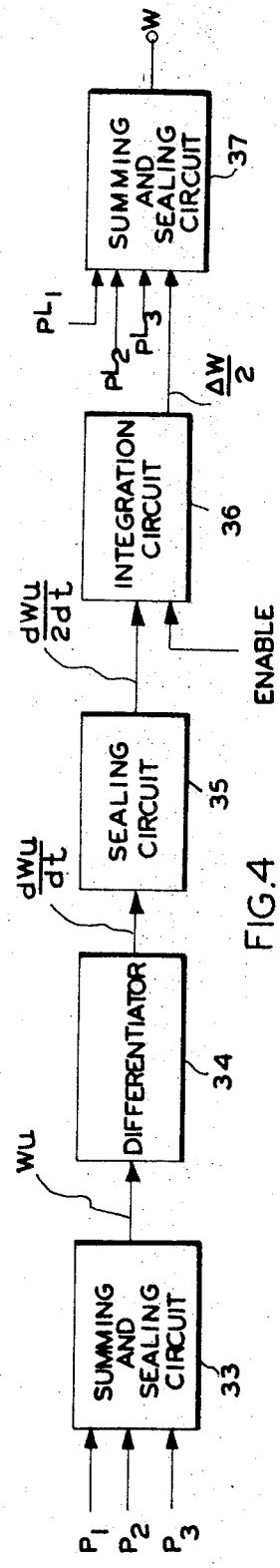
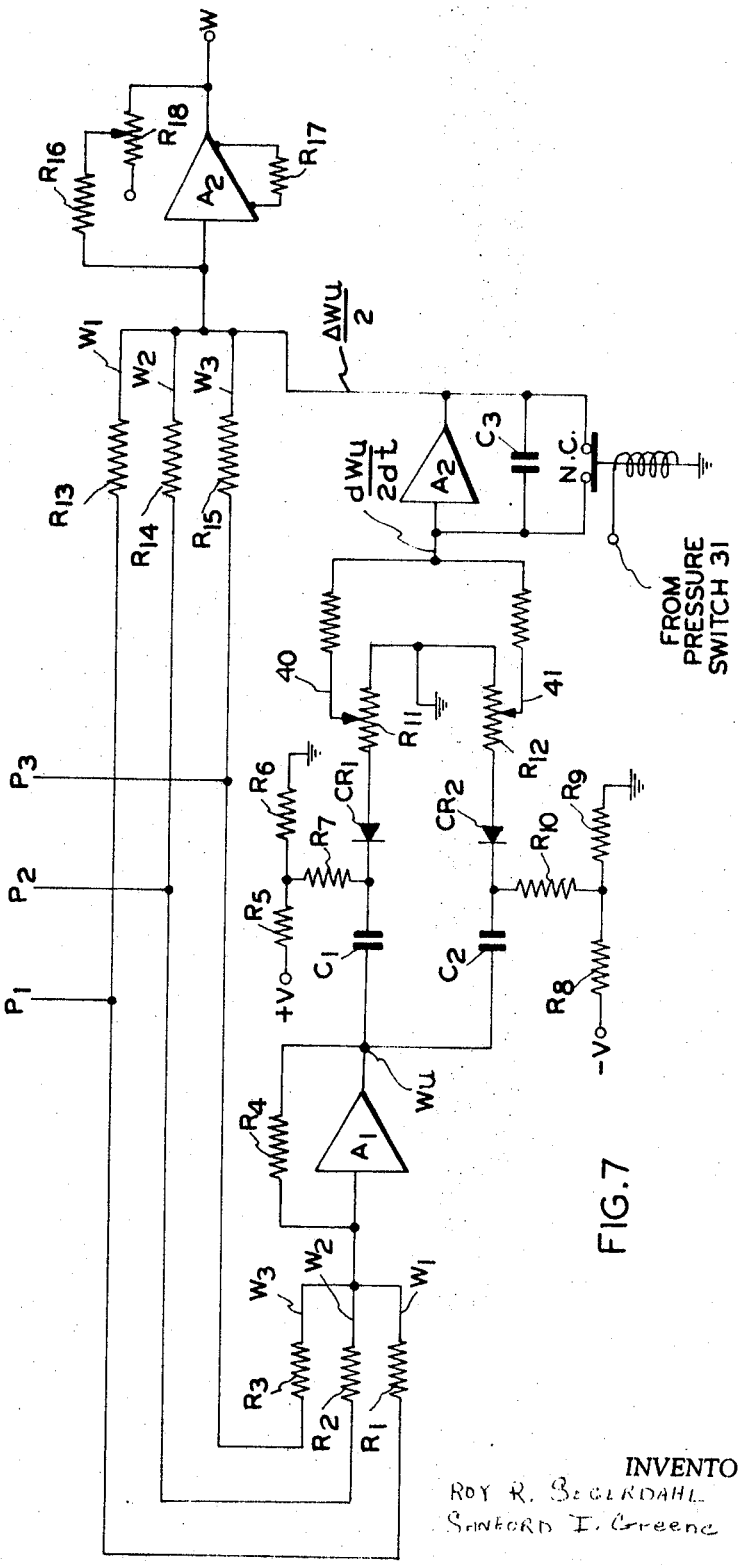

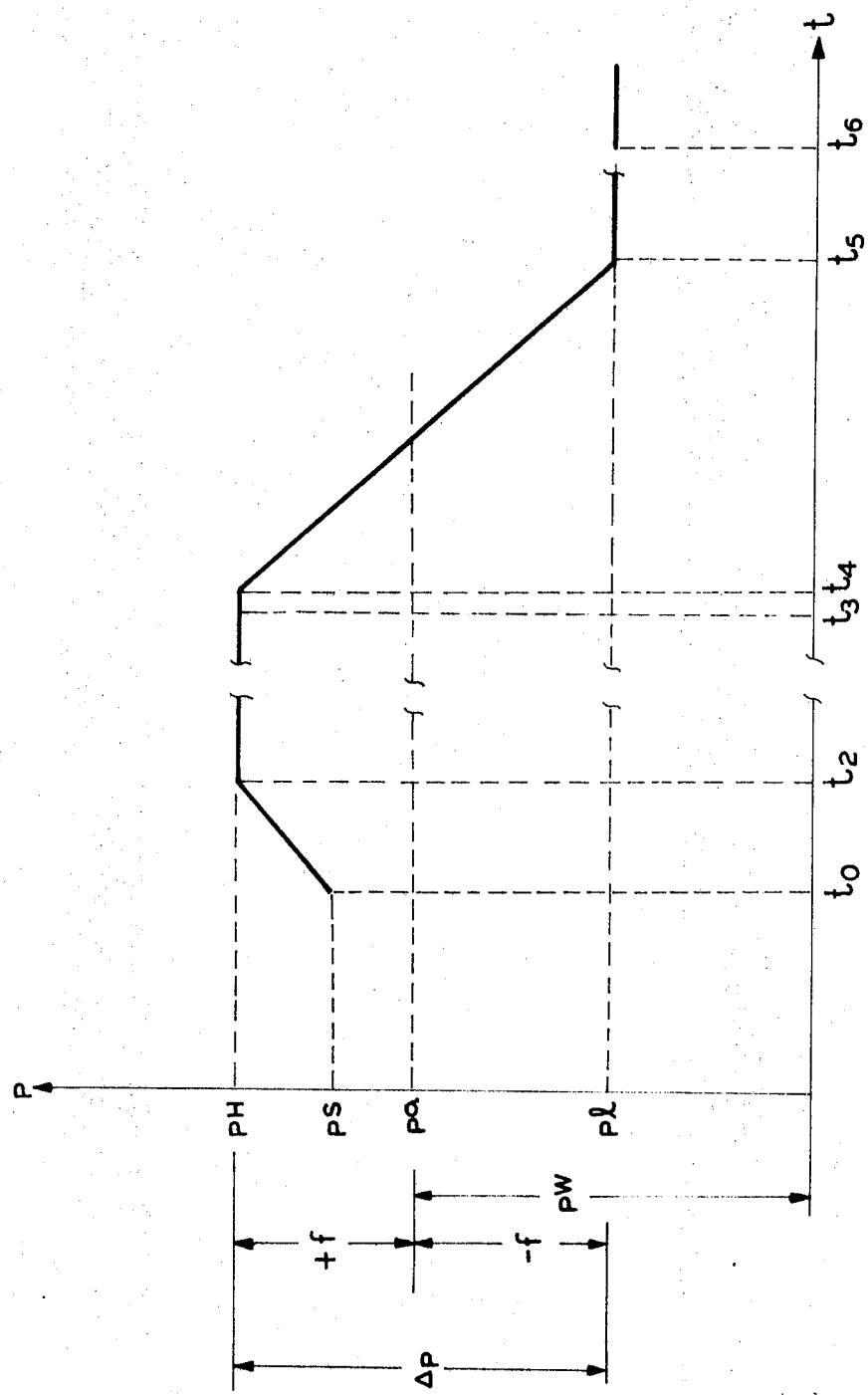

METHOD FOR REDUCING FRICTIONAL ERRORS IN DETERMINING THE WEIGHT OF AN OBJECT SUPPORTED BY A PNEUMATIC OR HYDRAULIC DEVICE

BACKGROUND OF THE INVENTION

1. Field of Use.

This invention relates to a method and apparatus for reducing frictional errors in detecting and determining the weight of an object supported by a device, and while the invention is subject to a wide range of applications, it relates particularly to a method and apparatus for detecting and determining such weights in connection with an aircraft supported by a plurality of such devices and will be particularly described in that connection. These devices may be pneumatic, hydraulic, or a combination thereof.

2. Description of the Prior Art

Systems for measuring aircraft weight and center of gravity are common in the prior art and can be classified as either manual or automated.

A manual system may employ individual scales which are placed under each of the wheeled struts supporting the aircraft. The weight readings obtained are then combined with data relating to the geometry of the aircraft being weighed and well known mathematical equations to determine the overall aircraft weight, center of gravity, means aerodynamic cord (MAC), percent MAC, etc.

The "manifest" system is another manual system employed to determine the above parameters. This is a statistical system in which the weight of each item carried by the plane, i.e., cargo, passengers, pilots, etc., are assigned known positions in the aircraft and the moments of each of these contributing weights are taken about some arbitrary reference axis; usually the nose of the aircraft. The weight of the aircraft and the known aircraft geometry are also included in this calculation. Usually, the above information is plotted on a special graph prepared for this purpose which directly furnishes the overall MAC and percent MAC figures.

The automatic systems employ a pressure sensor to measure the fluid pressure in the devices, usually oleo struts, which support the aircraft. The oleo pressure readings obtained are then converted to weight readings which, by means of a special purpose computer, are used to obtain the desired parameters.

The manual systems of measuring the indicated parameters have the serious disadvantages of being time consuming and subject to operator error. These are particularly undesirable qualities today, when every delay encountered in preparing an aircraft for takeoff increases the critical airport congestion problem and, of even greater importance, where operator error may result in fatal and costly accidents.

The automatic systems, on the other hand, are much quicker and certain, however, such prior art systems have an inherent, builtin friction error. The typical aircrafts of concern are supported by a plurality of oleo struts. These struts are basically, shock absorbing devices. Therefore, if we disregard friction and other outside forces and treat the aircraft as a free body, the oleo pressure within each of the oleo struts is indicative of the weight being supported by that strut. However, under actual conditions this approximation may be unsatisfactory. The actual forces supporting the portion of the oleo strut which is rigidly affixed to the aircraft proper, is the force exerted by the pressure within the device and the friction force existing between the moving elements of such device, i.e., the piston and cylinder. This friction force is not constant; it varies with the degree of the incline of the aircraft as well as with variations in aircraft loading.

In the past, many attempts have been made to reduce this objectionable and indeterminate frictional component. One such attempt substitutes dynamic friction for the higher static friction. This involves either vibrating or rotating the piston portion of the oleo strut relative to its cylinder. This method has the disadvantage of being only partially effective in reducing friction while it substantially increases wear and reduces strut life and reliability. In addition, such methods are relatively ineffective unless the aircraft strut is in line with the gravity vector.

It is an object of this invention, therefore, to provide a new and improved method and apparatus for reducing frictional errors in determining the weight of an object supported by a device which obviates one or more of the above mentioned disadvantages of the prior art systems.

It is another object of this invention to provide a new and improved method and apparatus for determining the weight of an object supported by a device which substantially reduces errors due to friction.

SUMMARY OF THE INVENTION

In accordance with the invention there is provided a method of reducing frictional errors in determining the weight of an object supported by a device. The pressure within the device is increased until a higher steady-state pressure is observed and then the pressure is decreased until a lower steady-state pressure is observed. One-half the difference in pressure between the higher and lower steady-state pressures, is added to the lower steady-state pressure to obtain a pressure signal proportional to the actual object weight.

For a better understanding of the present invention, together with further objects and features thereof, reference is had to the following description to be read in conjunction with the accompanying drawings wherein like components in the several views are identified by the same reference numeral, while its scope will be pointed out in the appended claims.

BRIEF DESCRIPTION OF THE DRAWINGS

FIG. 4 is a schematic diagram, in block form, illustrating the preferred electronic computations of the present invention.

FIG. 5 is a graph of Pressure versus Time for the oleo strut of the embodiment of the invention illustrated in FIG. 3.

FIG. 7 is a schematic representation of an electronic circuit configuration for performing the computations outlined in the block diagram illustrated in FIG. 4.

DESCRIPTION OF THE PREFERRED EMBODIMENT

Figure 1:
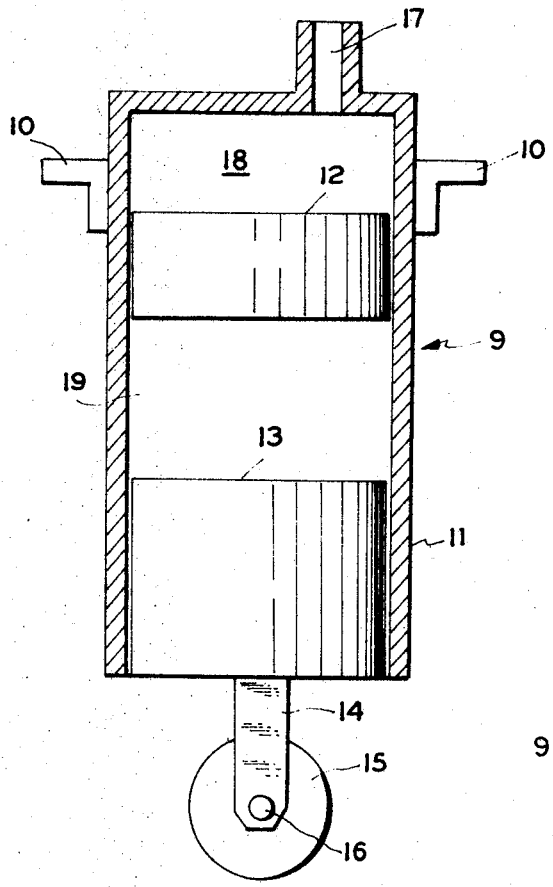
FIG. 1 is a cross-sectional schematic illustration of one type of oleo strut.

FIG. 1 is a schematic representation of one type of device specifically, an oleo strut, identified in general by the numeral 9, which may be used to support an aircraft affixed to bracket 10. Normally an aircraft is equipped with at least three struts of this nature, each of which may perform the dual function of supporting the aircraft and absorbing the shock experienced when landing. The oleo strut illustrated comprises a cylinder 11, an intermediate piston 12, a strut piston 13, a wheel strut 14, a wheel 15 and an axle 16.

An inlet port 17 connects inlet chamber 18 to an external source of hydraulic pressure (not shown) which must be capable of exerting the required force on intermediate piston 12. Piston 12 and 13 slidably engage the inner wall of cylinder 11 to form airtight and oiltight seals therebetween. Compression chamber 19, disposed between pistons 12 and 13, is filled with air or other inert gas.

The operation of the above-described apparatus is quite simple. Hydraulic pressure, applied at inlet port 17, exerts a force upon piston 12 which is transmitted to piston 13 by means of the compressible medium contained in chamber 19. This force is, in turn, transmitted to wheel 15 by means of strut 14 and axle 16.

Figure 2:
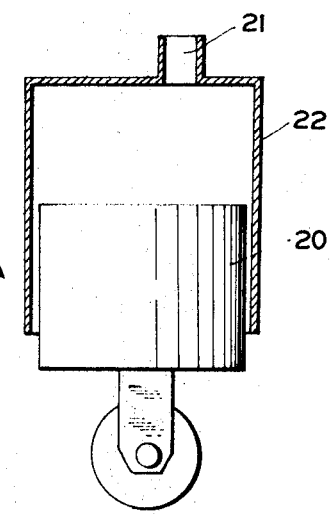
FIG. 2 is a cross-sectional schematic illustration of an alternative type of oleo strut.

A simplified device is illustrated in FIG. 2. This type of device utilizes a single piston 20. Pneumatic or hydraulic pressure is applied at inlet port 21. This pressure exerts a force on piston 20 which is slidably mounted within cylinder 22. The sidewalls of piston 20 form an airtight and oiltight seal with the inner wall of cylinder 22.

The embodiments shown in FIG. 1 and FIG. 2 form no part of the present invention. This discussion is included herein, as background information only and is not intended as an exhaustive treatment of all the types of devices which may be used in connection with the present invention, Many other types of pneumatic or hydraulic devices can be used as will be quite clear to those having ordinary skill in the art. In addition, although this invention will be described in connection with an apparatus and method for weighing an aircraft, it will be quite clear to those skilled in the art that it is equally suitable for use as a general purpose scale. Of course, in such a case the device would then comprise part of the scale rather than a portion of the object being weighted.

Figure 3:
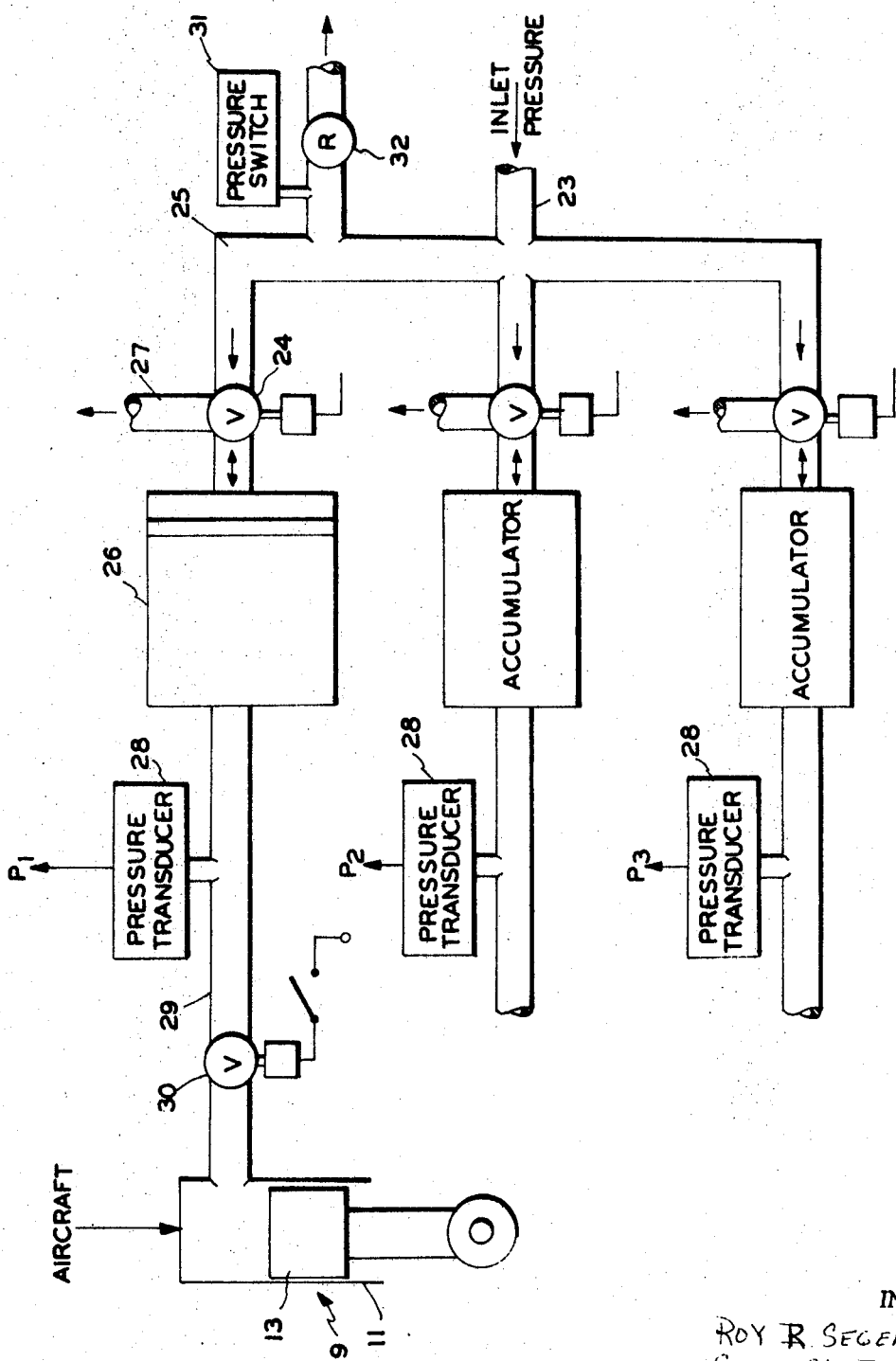
FIG. 3 is an illustration of an embodiment of the present invention as applied to an aircraft.

FIG. 3 is a schematic diagram of an illustrative embodiment of the apparatus of the present invention as applied to an aircraft supported by three oleo struts. For purpose of simplicity, the following discussion will refer to only one oleo strut 9, however, it is to be understood that this discussion applies to each of the three struts illustrated.

Inlet port 23, which must be connected to a suitable source of pneumatic or hydraulic power (not shown) is in direct connection with two-way valve 24 by means of conduit 25. Valve 24 in one position, connects conduit 25 to accumulator 26, and in its other position connects accumulator 26 to exhaust port 27.

Accumulator 26 which, for example, may be of the well-known piston type, is connected to oleo strut 9 and pressure transducer 28 by means of conduit 29. An on-off valve 30 is inserted in conduit 29 between oleo strut 9 and the other components of the system.

The structure of the apparatus of FIG. 3 having been discussed, the operation of this apparatus will now be explained. Valve 30 is opened and valve 24 is positioned so as to block exhaust port 27 and connect conduit 25 to accumulator 26. The inlet pressure thus applied to accumulator 26, in turn, causes the pressure in conduit 29 and oleo strut 9 to rise. When the oleo pressure within strut 9 rises to the point where the force exerted on piston 13 is equal to the aircraft weight supported by the strut plus the frictional force within strut 9, the aircraft will start to move in an upward direction. The pressure within oleo strut 9, after upward motion commences, remains substantially constant and will be referred to hereinafter as the "higher steady-state pressure".

When all accumulators 26 connected to conduit 25 reach their end positions during this compression cycle, the pressure within conduit 25 will start to rise toward the inlet pressure and this pressure rise will actuate pressure switch 31. Actuation of switch 31 has two effects. First, it causes valve 24 to rotate to its exhaust position blocking conduit 25 and connecting accumulator 26 to exhaust port 27. Second, it initiates the signal which enables integration as will be hereinafter explained.

When accumulator 26 is connected to exhaust port 27 the pressure therein starts to decrease and the pressure within conduit 29 and oleo strut 9 also starts to decrease. When the pressure within the oleo strut 9 decreases to the point where the force exerted on the surface of piston 13 is equal to the aircraft weight supported by oleo strut 9 minus the frictional forces within oleo strut 9, the aircraft will start to move downward. The pressure within oleo strut 9, after downward motion commences, remains substantially constant and will be referred to hereinafter as the "lower steady-state pressure".

Pressure transducer 28, connected to conduit 29, continually senses the oleo pressure within strut 9 and converts the sensed pressure to pressure representative electrical signals.

Relief valve 32 is utilized to limit the maximum pressure which may be applied to accumulator 26.

Valve 30 is included primarily as a safety measure and to protect pressure sensor 28 from shocks experienced when the aircraft lands. Valve 30 isolates oleo strut 9 from the remainder of the system therefore, leaks in the system to the right of valve 30 would have no effect on the primary supporting and shock-absorbing functions of strut 9.

It is to be noted that the apparatus of this invention may be included as an integral part of the aircraft or it may be used as ground equipment and attached to appropriate connection incroporated into each oleo strut.

FIG. 4 illustrates means for determining the difference between the weights represented by the higher and lower steady-state pressures. The signals $p1$, $p2$ and $p3$ from pressure transducers 28 are connected as inputs to Summing And Scaling Network 33. In this circuit these signals are summed and converted to force signals representative of the actual weight supported by each strut 9.

Neglecting friction, the weight supported by each strut 9 is the pressure within strut 9 multiplied by the effective surface area of the piston upon which the pressure acts. The effective area of each strut 9 may, of course, be different. Therefore, circuit 33 scales each input pressure signal to provide a normalized force signal representative of the weight supported by the corresponding struts. For example:

$$p1 \approx 1$$

or $$p1 = Kw1$$

where $k$ is a scaling constant dependent upon the effective area of piston 13; and $w1$ is the strut piston force corresponding to $p1$. The force signals $w1$, $w2$ and $w3$ are then summed to provide an output force signal, designated as $Wu$, representative of the total aircraft weight, uncorrected for frictional errors.

The $Wu$ output from circuit 33 is connected as an input to Differentiator 34 wherein, as its title suggests, the $Wu$ signal is differentiated to provide an output signal designated as $dWu/dt$ equivalent to the weight represented by the sum of the changes in pressure within struts 9. The $dWu/dt$ output of Differentiator 34 is connected as an input to scaling circuit 35 which reduces its amplitude by a factor of one-half.

Integration circuit 36 has two inputs; the output of scaling circuit 35, designated as $dWu/2dt$, and the Enable signal from pressure switch 31. The Enable signal, as was discussed above, indicates that all struts 9 are at the higher steady-state condition, i.e., their maximum functional pressure. It functions to enable integration circuit 36 so as to permit integration of the $dWu/2dt$ signal. At this point, valve 24 is placed in the exhaust position and the accumulator and oleo pressures begin to decrease. Integration circuit 36 integrates the $dWu/2dt$ signal to obtain the difference between the sums of the $w1$, $w2$ and $w3$ signals at the higher and lower steady-state conditions. This output is designated as $\Delta Wu/2$. This $\Delta Wu/2$ signal is the frictional error correction which must be added to the weight signal represented by the total of the scaled lower steady-state signals $w1$, $w2$ and $w3$. Alternatively the $\Delta Wu/2$ signal may be subtracted from the weight signal represented by the total of the scaled higher steady-state pressure signals $w1$, $w2$ and $w3$ to obtain the same result. Summing and Scaling Circuit 37 which performs either of the above computations, has an output signal $W$ representative of the actual weight of the aircraft.

Figure 6:
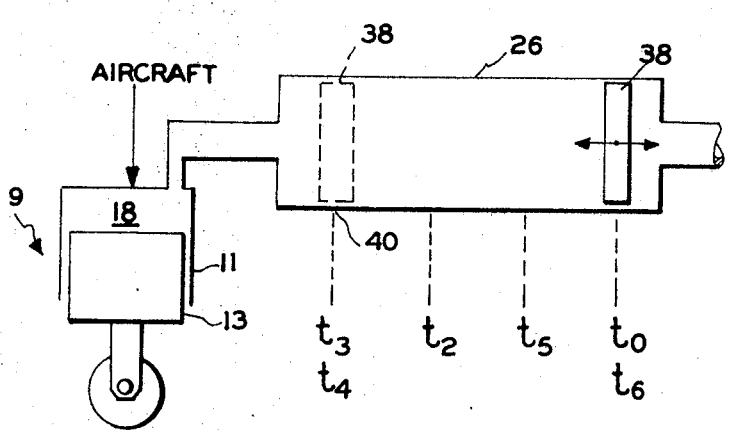
FIG. 6 is a schematic illustration of the relationship between the accumulator and oleo strut of the embodiment of FIG. 3.

Referring to FIGS. 5 and 6, the Oleo Pressure versus Time relationship for struts 9 and the relationship between accumulator 26 and strut 9 are illustrated to further clarify and explain the theory of operation of this invention. At time $t0$ the initial oleo pressure $pi$ may be at any point due to the indeterminate static frictional forces between piston 13 and cylinder 11. As plunger 38 moves from its start position 39 toward its stop position 40, the oleo pressure $p$ within inlet chamber 18 increases to higher steady-state pressure $pH$ at which time cylinder 11, which is affixed to the aircraft, begins to rise. Plunger 38 continues to move toward stop 40 and cylinder 11 continues to rise until time $t3$ when plunger 38 reaches its stop position 40. At this time the upward motion of cylinder 11 stops and the constant oleo pressure $pH$ is maintained. At $t4$, as was discussed above, pressure switch 31 closed (see FIG. 3) and valve 24 is placed in its exhaust position. This reduces the pressure within accumulator 26 and causes plunger 38 to move toward its start position 38. The oleo pressure $p$ within strut 9 also decreases causing cylinder 11 to move in a downward direction. At time $t5$ the oleo pressure $p$ reaches the lower steady-state valve $p2$. At this time the downward motion of cylinder 11 stops and constant oleo pressure $pi$ is maintained. At time $t6$ plunger 38 arrives at its start position 38 and the lower steady-state pressure reading $pi$ is scaled and summed with the $Wu/2$ signal in circuit 37.

Oleo pressure $pH$ is the pressure which, when acting upon strut piston 13, exerts a force sufficient to support the aircraft and overcome the frictional force between cylinder 11 and piston 13. Specifically, $pH \approx W+f$.
where $pH$=higher steady-state pressure
$W$=actual weight of the aircraft
$f$=frictional force between cylinder 11 and piston 13

Oleo pressure $pL$ is the pressure acting upon strut piston 13 that exerts a force which when added to the frictional force between cylinder 11 and piston 13 is sufficient to support the aircraft. Specifically, $pL \approx W-bf$
where $pL$ = lower steady-state-pressure Referring to FIG. 5, $pa$ is the actual oleo pressure that would exist in a frictionless system. In other words, in a frictionless system: $pa=pH=pL \approx W$. However, in a practical system, which includes friction $pa \neq pL \neq pH$ but: $pa \approx W$. In addition, if $\Delta p = pH-pL$ then:

$$pa = pL + \frac{\Delta p}{2} = pH - \frac{\Delta p}{2} \text{ therefore}$$

$$W \approx pL + \frac{\Delta p}{2} = KpL + \frac{K\Delta p}{2} \text{ or}$$

$$W = pH - \frac{\Delta p}{2} = KpH - \frac{K\Delta p}{2}$$

where $K$=a scaling constant relating effective piston area to pressure to obtain force. And if $$w = Kp \quad \text{then} \quad W = wL + \frac{\Delta w}{2}$$

However, the aircraft is supported by a plurality of oleo struts, therefore, $$W = \Sigma wL + \Sigma \frac{\Delta w}{2} \text{ and if } \Sigma \frac{\Delta w}{2} = \frac{\Delta Wu}{2}$$

and $\Sigma wL = WL$ then $W = WL + \frac{\Delta Wu}{2}$ or $W = WH - \frac{\Delta Wu}{2}$ It can be readily seen that the above equation could be satisfied without any integration or differentiation as $$\frac{\Delta Wu}{2} = \frac{WH - W1}{2}$$

Therefore, the differentiation and integration operations described with reference to FIG. 4 is merely a method of obtaining the average pressure $pa$ and converting it to a force by the proper scaling factors. Of course, the same result could be obtained by recording $pH$ and $pL$, obtaining half the difference by ordinary addition and subtraction computations and adding the resultant signal to the sum of the $pL$ signals or subtracting it from the sum of the $pH$ signals.

FIG. 7 is a schematic diagram of an actual electronic configuration which would function as outlined in the block diagram illustrated in FIG. 4. The signals $p1$, $p2$ and $p3$ from pressure transducers 28 (see FIG. 3) are connected to scaling resistors R1, R2 and R3, respectively, to provide force signals $w1$, $w2$ and $w3$. These force signals are summed in a conventional summing network consisting of operational amplifier A1 and resistor R4. The output signal $Wu$ is connected to a Differentiator comprising: dual polarity biasing circuits R5, R6 and R7, and R8, R9 and R10; differentiating capacitors C1 and C2, differentiating potentiometers R11 and R12 and diodes CR1 and CR2. R11 and R12, in addition, be forming part of the differentiation circuit also serve to scale the $dWu/dt$ differentiated output by a factor of one-half. This is accomplished by properly positioning the wiper arms 40 and 41 of potentiometers R11 and R12.

The output signal $dWu/dt$ is introduced into a conventional integration circuit comprising operational amplifier A2 and capacitor C3. Switch 42, which is normally closed prevents integration except when energized by pressure switch 31. The Resistors R13, R14 and R15 scale the $p1$, $p2$ and $p3$ pressure signals obtained at the lower steady-state pressure condition to obtain the corresponding force signals $w1$, $w2$, and $w3$. These force signals are summed with the $\Delta W/2$ signal in a conventional summing circuit comprising operational amplifier A3, resistors R16 and R17, and potentiometer R18 to provide the output signal $W$ representative of the actual weight of the aircraft.

While what has been shown and described is believed to be the best mode and preferred embodiment of this invention, modifications and variations can be made therein, as will be clear to those skilled in the art, without departing from the spirit of the invention.

What I claim is:

1. A method for reducing frictional errors in determining the weight of an object supported by a pneumatic or hydraulic device or a combination thereof which comprises:
   increasing the pressure within the device until a higher steady-state pressure is obtained;
   decreasing the pressure within the device until a lower steady-state pressure is obtained;
   determining the difference between the higher and lower steady-state pressures; and
   adding one-half the pressure difference to the lower steady-state pressure.

2. A method for reducing frictional errors in determining the weight of an object supported by a pneumatic or hydraulic device or combination thereof which comprises:
   increasing the pressure within the device until a higher steady-state pressure is obtained;
   decreasing the pressure within the device until a lower steady-state pressure is obtained;
   determining the difference between the upper and lower steady-state pressures; and
   subtracting one-half the pressure difference from the higher steady-state pressure.

3. For an aircraft supported by a plurality of oleo struts, a method of reducing frictional errors in determining the weight of the aircraft which comprises:
   increasing the pressure within each of the oleo struts until higher steady-state pressures are obtained;
   decreasing the pressure within each of the oleo struts until lower steady-state pressures are obtained;
   determining the difference between the sums of the higher and lower steady-state pressures; and
   adding one-half of the pressure difference to the sum of the lower steady-state pressures.

4. For an aircraft supported by a plurality of oleo struts, a method of reducing frictional errors in determining the weight of the aircraft which comprises:
   increasing the pressure within each of the oleo struts until upper steady-state pressures are obtained;
   decreasing the pressure within each of the oleo struts until lower steady-state pressures are obtained;
   determining the difference between the sums of the upper and lower steady-state pressures; and
   subtracting the one-half of the pressure difference from the sum of the higher steady-state pressures.